(12) United States Patent
Amerson

(10) Patent No.: US 6,827,363 B1
(45) Date of Patent: Dec. 7, 2004

(54) TRAILER HITCH ALIGNMENT APPARATUS

(76) Inventor: James Amerson, Star Rte. Box 171A, Swansea, SC (US) 29160

( * ) Notice: Subject to any disclaimer, the term of this patent is extended or adjusted under 35 U.S.C. 154(b) by 0 days.

(21) Appl. No.: 10/459,354

(22) Filed: Jun. 11, 2003

(51) Int. Cl.[7] .................................................. B60D 1/40
(52) U.S. Cl. .......................................... 280/477; 33/264
(58) Field of Search ................................ 280/477, 432, 280/504, 511; D12/162; 116/28 R; 33/264

(56) References Cited

U.S. PATENT DOCUMENTS

| | | | | |
|---|---|---|---|---|
| 3,889,384 | A | * | 6/1975 | White .......................... 33/264 |
| 3,901,536 | A | * | 8/1975 | Black .......................... 280/477 |
| 4,666,176 | A | * | 5/1987 | Sand ........................... 280/477 |
| 4,687,220 | A | * | 8/1987 | Danielson .................... 280/477 |
| 5,113,588 | A | * | 5/1992 | Walston ....................... 33/264 |
| 5,269,554 | A | * | 12/1993 | Law et al. .................... 280/477 |
| 5,285,205 | A | * | 2/1994 | White .......................... 340/435 |
| 6,209,902 | B1 | * | 4/2001 | Potts ........................... 280/477 |
| 6,273,448 | B1 | * | 8/2001 | Cross ........................... 280/477 |
| 6,341,794 | B1 | * | 1/2002 | Hunter ......................... 280/477 |
| 6,386,572 | B1 | * | 5/2002 | Cofer ........................... 280/477 |
| 6,517,098 | B2 | * | 2/2003 | Grasso et al. ................ 280/477 |
| 6,585,281 | B1 | * | 7/2003 | Voorting ...................... 280/477 |

* cited by examiner

*Primary Examiner*—Lesley D. Morris
*Assistant Examiner*—Tony Winner
(74) *Attorney, Agent, or Firm*—McNair Law Firm, P.A.

(57) ABSTRACT

A alignment apparatus for assisting a driver in directing coupling engagement between a towing vehicle hitch and a trailer hitch. The apparatus includes a guide carried by the towing vehicle representing the position of the towing vehicle hitch for being visible to the driver. A target is carried by the trailer representing the position of the trailer hitch for being visible to the driver. The target has a pair of laterally spaced posts defining a target zone for receiving the guide to align the towing vehicle hitch with the trailer hitch for coupling engagement. A sensor is carried by the guide for determining whether the guide is within the target zone. An indicator is operatively associated with the sensor for indicating to the driver when the guide is within the target zone to alert the driver of alignment between the towing vehicle hitch and the trailer hitch for coupling engagement.

26 Claims, 7 Drawing Sheets

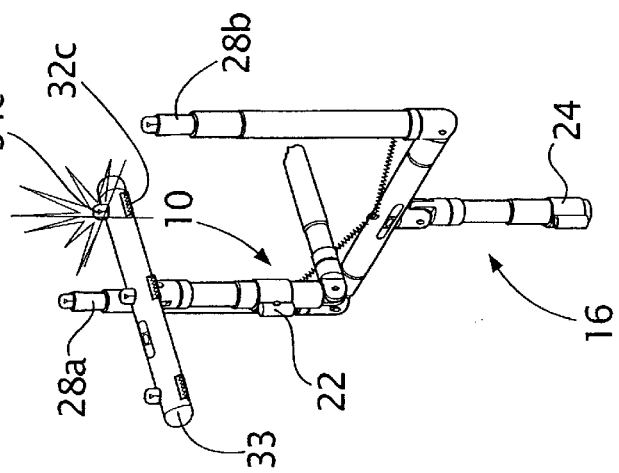
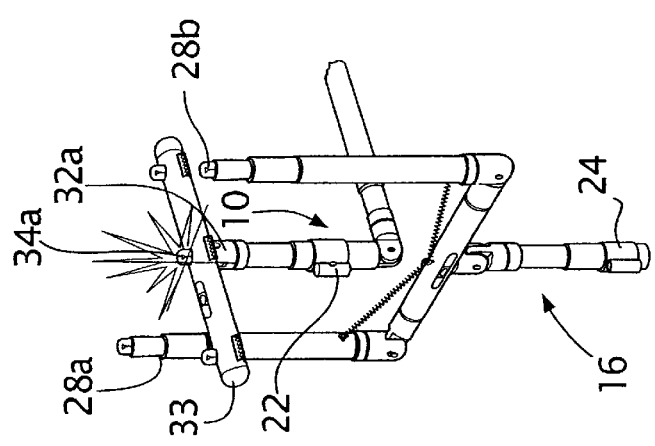
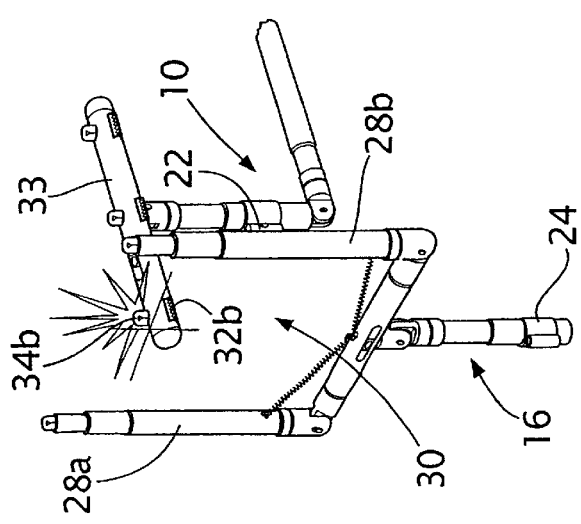

TRAILER HITCH ALIGNMENT APPARATUS

FIELD OF THE INVENTION

The present invention relates generally to trailer hitches, and more particularly, to a trailer hitch alignment apparatus for easily aligning the hitch mechanism of a towing vehicle with the hitch mechanism of a trailer for coupling engagement.

BACKGROUND OF THE INVENTION

Alignment of the hitches between a towing vehicle and a trailer is an area to which considerable attention has been directed in an effort to simplify the task of engaging the various hitching components. Because the hitches are not visible from the drivers seat, the process of aligning the hitches for engagement is difficult and requires the attention of two people. Typically, one person will be driving the vehicle and one directing the driver to align the hitch of the vehicle with the hitch of the trailer for engagement. When the driver is alone, the problems associated with the process of alignment can make engagement between large, otherwise immovable, vehicles extremely difficult. As a result, a driver is often required to do a considerable amount of maneuvering of the towing vehicle before properly aligning the hitches.

In attempts to simplify this process, a variety of apparatus have been developed. For example, U.S. Pat. No. 3,901,536 discloses an apparatus for aligning hitches of towing and towed vehicles. The invention includes a target assembly attached to the trailer and aligned with the hitch thereon for cooperating with a sighting apparatus attached to the towing vehicle. The invention requires the sighting apparatus to contact a thin pair of wires that signal when the hitches are aligned. The wires are extremely difficult to see and easily damaged. Additionally, if the sighting apparatus were to contact another part of the target assembly during a misalignment, the rigidity of the structure may cause damage to the apparatus, towing vehicle, and trailer.

U.S. Pat. No. 4,961,590 discloses another trailer hitching apparatus that includes elevated visual reference balls mounted on elongated rigid post disposed on the trailer and towing vehicle. The towing vehicle hitch is aligned with the trailer hitch by driving the towing vehicle backwards such that a visual reference ball on the trailer is positioned between a pair of visual reference balls on the towing vehicle. The invention does not provide any means for determining when the balls are laterally aligned to prevent the towing vehicle from backing into the trailer and causing damage. Additionally, the lack of flexibility in the reference ball post may cause them to break if hit during the hitching process.

U.S. Pat. No. 5,970,619 discloses a further example of a device for guiding alignment in trailer hitching. The device requires that a towing vehicle attachment visible by the driver make direct physical contact with a trailer attachment to indicate proper alignment. Again, with direct contact, the attachments may be damaged or dislodged, preventing accurate alignment of the hitching components.

Accordingly, it is an object of the present invention to provide a trailer hitch alignment apparatus that creates a visual reference for the towing vehicle driver as to the actual alignment positions of the hitch components to assist the driver in directing coupling engagement between the towing vehicle and trailer hitching components.

It is an object of the present invention to provide a trailer hitch alignment apparatus that includes a vehicle attachment cooperating with a trailer attachment through at least one sensor to determine alignment.

It is an object of the present invention to provide a trailer hitch alignment apparatus that includes a bendable vehicle attachment and trailer attachment so that accidental contact between the vehicle attachment and trailer attachment will not cause damage.

It is an object of the present invention to provide a target zone on the trailer and an alignment guide on the vehicle from which the vehicle driver can receive immediate visual feedback from the driver's seat as to the proper orientation of the hitching components.

It is an object of the present invention to provide a trailer hitch alignment apparatus with an indicator for notifying the towing vehicle driver that the vehicle attachment and trailer attachment are aligned for coupling engagement.

It is an object of the present invention to provide a trailer hitch alignment apparatus that is quick and simple to install and remove from the towing vehicle and trailer.

It is an object of the present invention to provide a trailer hitch alignment apparatus that is adjustable to accommodate use on a variety of vehicles and trailers.

SUMMARY OF THE INVENTION

The above objectives are accomplished according to the present invention by providing a trailer hitch alignment apparatus for assisting a driver in directing coupling engagement between a towing vehicle hitch and a trailer hitch. The apparatus includes a guide carried by the towing vehicle representing the position of the towing vehicle hitch and being constructed and arranged to be visible to the driver. A target is carried by the trailer representing the position of the trailer hitch and being constructed and arranged to be visible to the driver. The target has a pair of laterally spaced posts defining a target zone for receiving the guide to align the towing vehicle hitch with the trailer hitch for coupling engagement. A sensor is carried by the guide for determining whether the guide is within the target zone. An indicator is operatively associated with the sensor for indicating to the driver when the guide is within the target zone to alert the driver of alignment between the towing vehicle hitch and the trailer hitch for coupling engagement.

In a further advantageous embodiment, a guide positioning member is carried by the guide for vertically positioning the guide over the towing vehicle hitch. Additionally, a target positioning member is carried by the target for vertically positioning the target above the trailer hitch.

Preferably, the guide includes a guide offsetting member for laterally offsetting the guide. The guide offsetting member has an aligned position wherein the guide is positioned vertically above the towing vehicle hitch, and an offset position wherein the guide is shifted laterally from the aligned position. Accordingly, the target also includes a target offsetting member for laterally offsetting the target. The target offsetting member has a first position wherein the target is positioned vertically above the trailer hitch, and a second position wherein the target is shifted laterally from the first position a distance equal to the lateral shift of the guide in the offset position so that the target cooperates with the guide in the offset position to provide an offset visual representation to the driver as to the position of the towing vehicle hitch and the trailer hitch for directing coupling engagement.

In a further advantageous embodiment, the guide includes a first sensor for determining when the guide is entering the target zone, a second sensor for determining when the guide is aligned within the target zone for coupling engagement, and a third sensor for determining when the guide has passed through the target zone. The guide also includes a first indicator operatively associated with the first sensor for signaling the driver when the guide is entering the target zone, a second indicator operatively associated with the second sensor for signaling the driver when the guide is aligned for coupling engagement, and a third indicator operatively associated with the third sensor for signaling the driver when the guide has passed through the target zone.

A guide attachment member is carried by the guide for mounting the guide to the towing vehicle, preferably, in a releasable manner. A target attachment member is carried by the target for mounting the guide to the trailer, also preferably in a releasable manner to allow the guide and target to be used on a plurality of vehicles.

A level indicator is carried by the guide and the target for horizontal alignment of the guide and the target to facilitate accurate coupling engagement between the towing vehicle hitch and the trailer hitch.

Additionally, at least one target lighting member is carried by the target for lighting the target posts to increase visibility in low light conditions to assist the driver in directing the guide into the target zone. Also, at least one guide lighting member is carried by said guide for lighting the guide to increase visibility in low light conditions to assist the driver in directing the guide into the target zone.

A pivot member is provided for carrying the posts on the target. The pivot member is biased to maintain the posts in vertical parallel arrangement while allowing the posts to bend if struck by the guide during the process of coupling engagement.

In a further advantageous embodiment, the guide is constructed and arranged to telescope between various lengths so that the guide can be manipulated to be positioned vertically above the towing vehicle hitch. Further, the target is constructed and arranged to telescope between various lengths so that the target zone can be manipulated to be positioned vertically above the trailer hitch to cooperate with the guide for directing coupling engagement.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIGS. 6a, 6b, and 6c show the interaction between the guide and target for signaling to the driver the relative positions of the vehicle hitch and trailer hitch for alignment according to the invention;

DETAILED DESCRIPTION OF A PREFERRED EMBODIMENT

Figure 1:
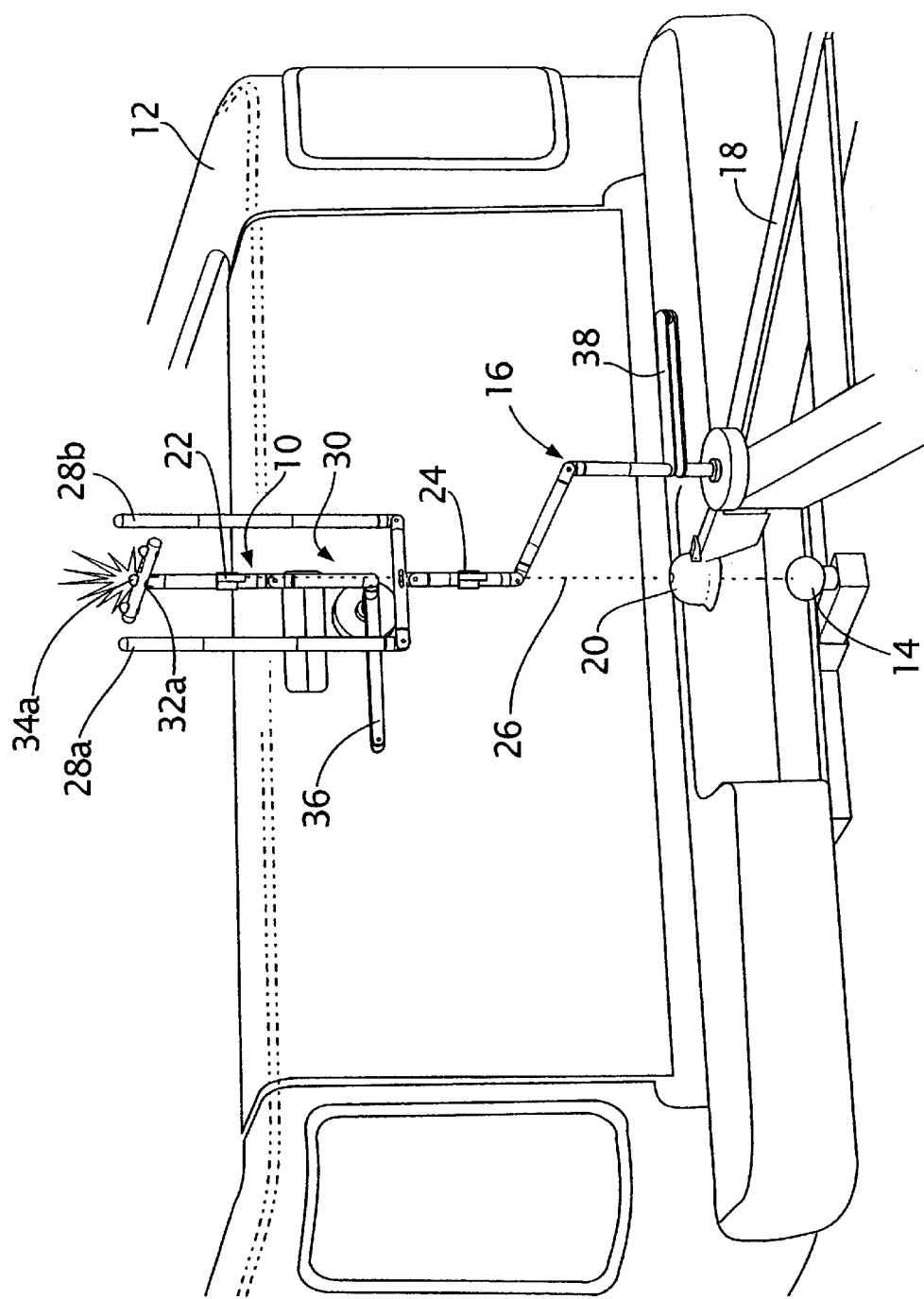
FIG. 1 shows a perspective view of the guide carried on the tailgate of a truck for aligning with the target according to the invention.
Figure 2:
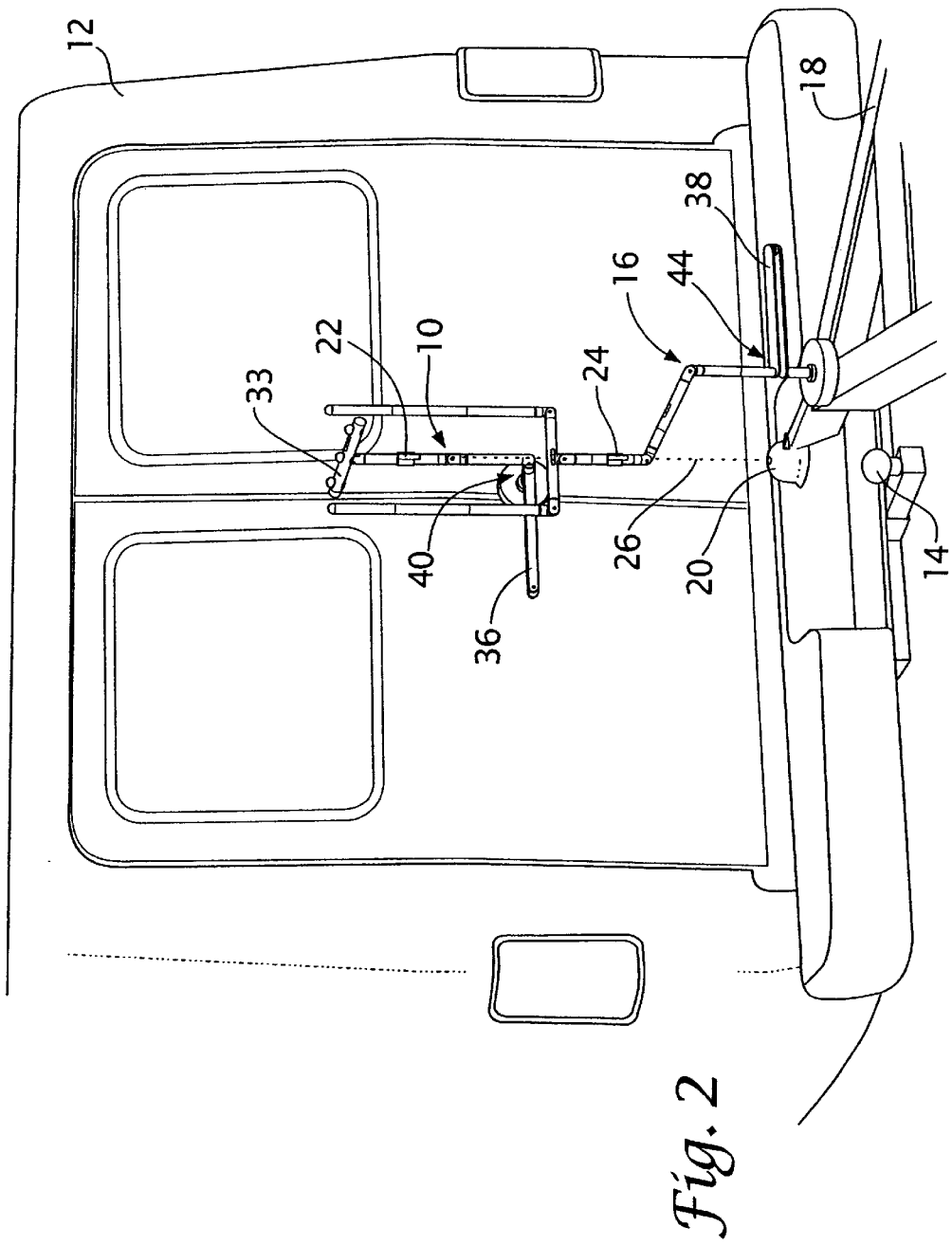
FIG. 2 shows a perspective view of the guide carried on the rear of a vehicle in a location not viewable to the driver but aligned above the vehicle hitch for aligning with the target according to the invention.

With reference to the drawings, the invention will now be described in more detail. Referring to FIG. 1, a trailer hitch alignment apparatus is shown for assisting a driver in directing coupling engagement between a towing vehicle hitch and a trailer hitch. The apparatus includes a guide, designated generally as 10, carried by towing vehicle 12, representing the position of towing vehicle hitch 14 and being constructed and arranged to be visible to the driver when mounted to the rear of towing vehicle 12. A target, designated generally as 16, is carried by trailer 18, representing the position of trailer hitch 20 and being constructed and arranged to be visible to the driver to interact with guide 10 to provide a visible representation to the driver as to the alignment locations of the towing vehicle hitch and the trailer hitch for directing coupling engagement. As best shown in FIGS. 1 and 2, guide 16 is positioned vertically above towing vehicle hitch 14, and target 16 is positioned vertically above trailer hitch 20. In this arrangement, by locating the guide and target sufficiently above the towing vehicle hitch and trailer hitch to be viewable by the driver, the driver may back up the towing vehicle by directing the guide at the target, thereby directing the towing vehicle hitch into alignment for coupling engagement with the trailer hitch.

Figure 5:
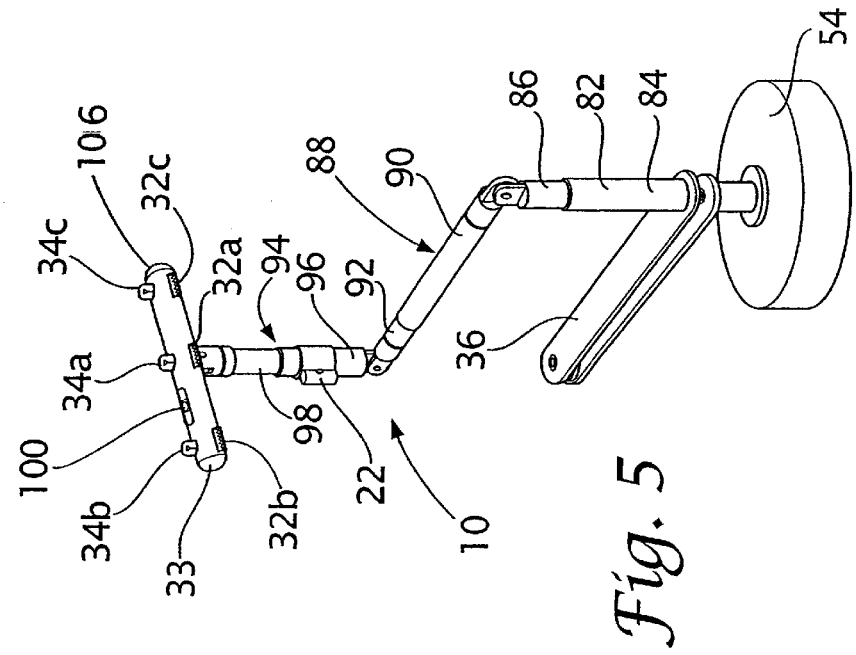
FIG. 5 shows a detailed perspective view of the guide according to the invention.

Referring to FIG. 5, a guide positioning member 22 is carried by the guide. As best shown in FIGS. 1 and 2, guide positioning member 22 is provided for vertically positioning the guide over the towing vehicle hitch. Additionally, referring to FIG. 4, a target positioning member 24 is carried by the target. As best shown in FIGS. 1 and 2, target positioning member 24 is provided for vertically positioning the target above the trailer hitch. This ensures that guide 10 and target 16 can properly align towing vehicle hitch 14 and trailer hitch 20 for coupling engagement.

In the preferred embodiment, guide positioning member 22 and target positioning member 24 comprises laser pointing devices which emits a powerful light beam 26 between guide 10 and towing vehicle hitch 14, as well as between target 16 and trailer hitch 20, respectively. Accordingly, by shining the laser pointer downward from guide 10 onto towing vehicle hitch 14, the guide can be accurately vertically aligned above the towing vehicle hitch. Furthermore, by shining the laser pointer downward from target 16 onto trailer hitch 20, the target can be accurately vertically aligned above the trailer hitch to cooperate with guide 10 for very accurate alignment for coupling engagement. Alternatively, a retractable rod could be carried by the guide for extending between the guide and towing vehicle hitch for vertically aligning the guide over the vehicle hitch. As well, a retractable rod could alternatively be carried by the target for extending between the target and trailer hitch for vertically aligning the target over the vehicle hitch.

Referring to FIG. 1, target 16 has a pair of laterally spaced posts 28a and 28b. The area between the posts defines a target zone, designated generally as 30. Guide 10 is directed by the driver to be received between posts 28a and 28b in target zone 30. When guide 10 is properly positioned between the posts as described herein below, this represents to the driver an alignment of towing vehicle hitch 14 with trailer hitch 20 for coupling engagement.

Because it can be difficult to tell when guide 10 is within target zone 30 of target 16, at least one sensor 32a is carried by guide 10 for determining whether the guide is within target zone 30. Additionally, at least one indicator 34a is operatively associated with the sensor for indicating to the driver when the guide is within target zone 30 to alert the driver of alignment between the towing vehicle hitch and the trailer hitch for coupling engagement. While indicator 34a could be located in a remote location from guide 10 and target 16, such as in the vehicle passenger compartment, it is preferably carried by guide 10.

Referring to FIG. 5, in the preferred embodiment, guide 10 includes an elongated sensor bar 33 for supporting a plurality of sensors and indicators to represent to the driver when the guide is approaching target zone 30, when the guide is aligned within target zone 30, and when the guide has passed to far through target zone 30. Sensor bar 33 includes a first sensor 32b carried at a first distal end of sensor bar 33. A second sensor 32a is positioned in the middle of sensor bar 33 and is generally vertically aligned with guide positioning member 22. A third sensor 32c is carried on a second distal end of sensor bar 33. Sensor bar 33 includes a first indicator 34b carried at the first distal end of sensor bar 33, a second indicator 34a carried in the middle of sensor bar 33, and a third indicator carried at the second distal end of sensor bar 33.

Preferably, sensors 32a, 32b, and 32c are proximity sensors adapted for detecting the location of sensor bar 33 in relation to posts 28a and 28b of target 16. It is commonly known to a person skilled in the art that a variety of other sensors may also be used, such as photoelectric sensors which read the position of the posts, or electromagnetic sensors which would read the presence of magnets carried by the posts. Preferably, indicators 34a, 34b, and 34c are lights of a single or multiple colors carried by sensor bar 33 that correspond to the position of sensors 32a, 32b, and 32c when entering target zone 30, respectively. Alternatively, a sound generating indicator may be operatively associated with the sensors to signal a particular sound when the corresponding sensor is activated.

Referring to FIG. 6a, as first sensor 32b enters target zone 30 between posts 28a and 28b of target 16, first sensor 32b detects the proximity of posts 28a and 28b as sensor bar 33 is entering target zone 30. First indicator 34b is operatively associated with first sensor 32b for signaling to the driver that guide 10 is entering the target zone, in which case that driver can slow the speed of the towing vehicle.

Referring to FIG. 6b, as second sensor 32a enters target zone 30 between posts 28a and 28b of target 16, second sensor 32a detects the proximity of posts 28a and 28b as sensor bar 33 is entering target zone 30. As noted above, second sensor 32a is carried on sensor bar 33 vertically aligned above guide positioning member 22 for detecting the proper alignment position of towing vehicle hitch 14 over trailer hitch 20. As target 16 is vertically aligned above trailer hitch 20 so that target zone 30 represents the position of trailer hitch 20, when sensor 32a is within target zone 30, the hitches are aligned for coupling engagement. If second sensor 32a is not vertically aligned with towing vehicle hitch 14, alignment between the hitches may not be achieved. Second indicator 34a is operatively associated with second sensor 32a for signaling to the driver that guide 10 is aligned within target zone 30, representing alignment between towing vehicle hitch 14 and trailer hitch 20 for coupling engagement.

Referring to FIG. 6c, as third sensor 32c enters target zone 30 between posts 28a and 28b of target 16, third sensor 32c detects the proximity of posts 28a and 28b as sensor bar 33 is leaving target zone 30. Third indicator 34c is operatively associated with third sensor 32c for signaling to the driver that guide 10 is leaving the target zone, in which case that driver can reverse the towing vehicles direction and slowly pull forward until second indicator 34a signals alignment.

In a more simplified embodiment, sensor bar 33 includes only a single proximity sensor 32a vertically aligned above guide positioning member 22 for detecting the proper alignment position of towing vehicle hitch 14 over trailer hitch 20 when positioned in target zone 30. Two indicator lights 34a and 34b are then operatively associated with the single proximity sensor. In this embodiment, indicator lights 34a and 34b are different colors, preferably red and green, in which the green light remains on until proximity sensor 32a detects it is within target zone 30, and then the red light comes on to signal the driver to stop.

Figure 3:
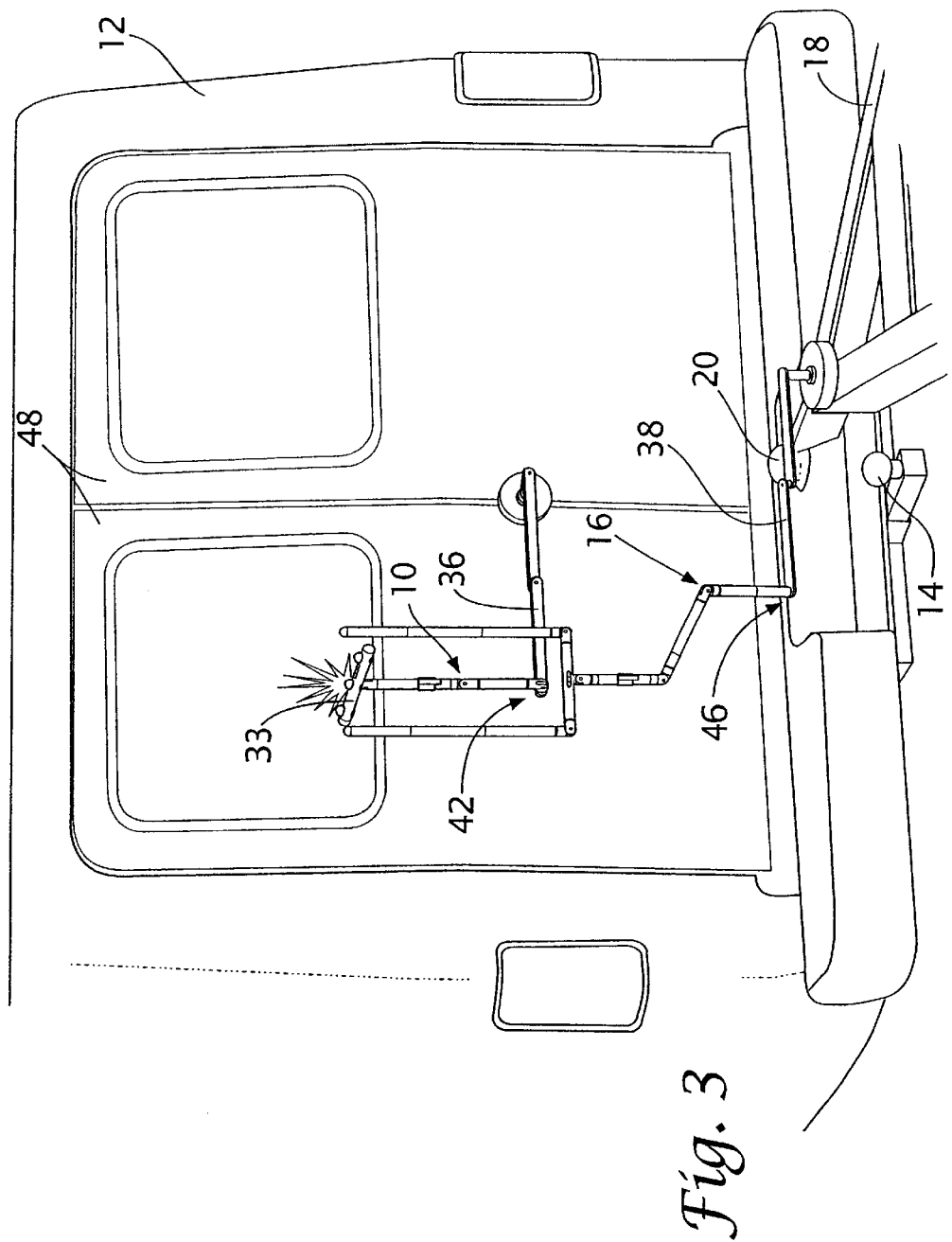
FIG. 3 shows a perspective view of the guide and target laterally offset to be in a position viewable to the driver according to the invention.

Referring to FIG. 5, guide 10 includes a guide offsetting member 36 for laterally offsetting the guide in situations when the guide is not viable to the driver when aligned vertically over the towing vehicle hitch. Referring to FIG. 2, guide offsetting member 36 has an aligned position, designated generally as 40, wherein guide 10 is positioned vertically above the towing vehicle hitch using guide positioning member 22. This is important as the guide must first be aligned over the towing vehicle hitch before it can be laterally offset to a position viewable by the driver. As best shown in FIG. 3, guide offsetting member 36 includes an offset position, designated generally as 42, wherein guide 10 is shifted laterally from aligned position 40, so that the guide is viewable by the driver through the rear window of the vehicle. In the aligned position of FIG. 2, the intersection of the two vehicle doors 48 blocks the drivers view of the guide for directing alignment with target 16. The guide offsetting member allows for a wide range of adaptability to a variety of vehicles.

Referring to FIG. 5, because target 16 must cooperate with guide 10 for directing coupling engagement, target 16 also includes a target offsetting member 38 for laterally offsetting the target. Referring to FIG. 2, accordingly, target offsetting member 38 has a first position, designated generally as 44, wherein target 16 is positioned vertically above trailer hitch 20 using target positioning member 24. As noted above with guide 10, it is first important to align the target vertically over the trailer hitch before shifting the target laterally. Referring to FIG. 3, target offsetting member 38 also includes a second position, designated generally as 46, wherein target 16 is shifted laterally from first position 44 a distance equal to the lateral shift of guide 10 in offset position 42 so that the target cooperates with the guide in the offset position to provide an offset visual representation to the driver as to the position of the towing vehicle hitch and the trailer hitch for directing coupling engagement.

Figure 4:
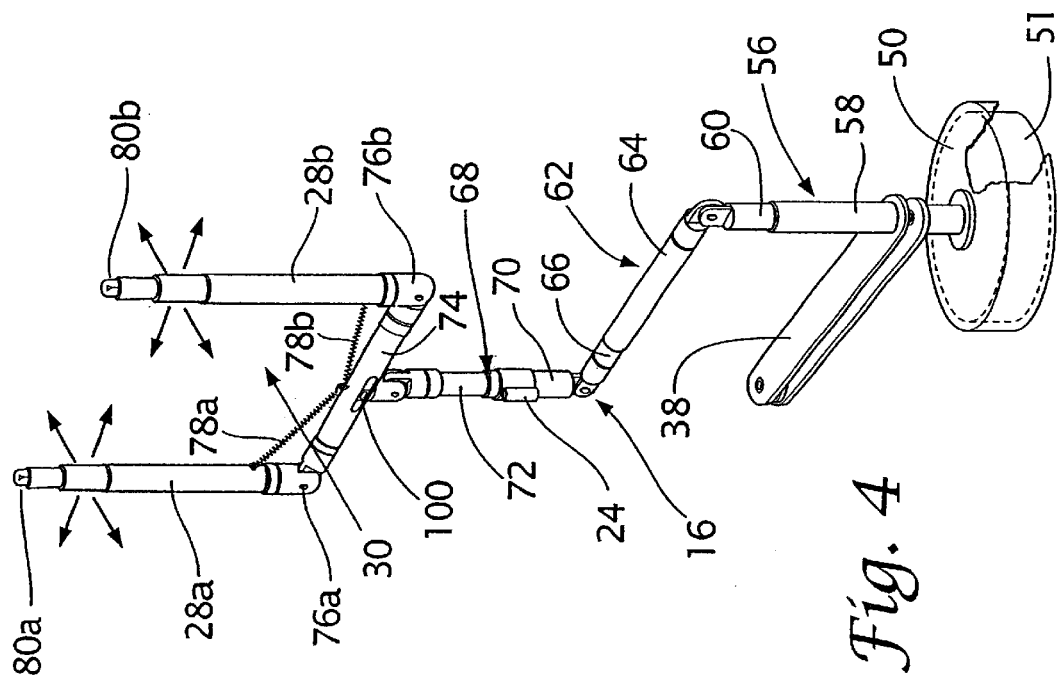
FIG. 4 shows a detailed perspective view of the target according to the invention.

Referring to FIG. 4, target 16 includes a target attachment member 50 for mounting the target to the trailer. Preferably, target attachment member 50 is a magnet 51 with sufficient strength to carry target 16 in a vertically mounted orientation or a horizontally mounted orientation.

Referring to FIG. 5, guide 10 includes a guide attachment member 54 for mounting the guide to the towing vehicle, preferably, using the magnet embodiment discussed in FIG. 4 for the target attachment member.

Figure 7:
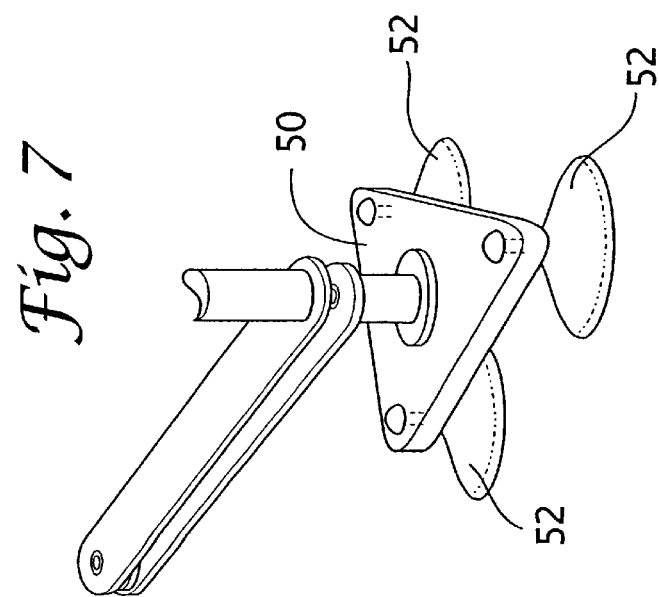
FIG. 7 shows an alternative attachment member for mounting the guide and target to the vehicle according to the invention.

Referring to FIG. 7, an alternative attachment member is shown for use with both target 16 and guide 10, which is comprised of a series of suction cups 52 that can be used to mount target 16 or guide 10 to a smooth surface, such as a window or vehicle body panel. Target attachment member 50 and guide attachment member 54 are preferably releasable to allow the guide and target to be used on a plurality of vehicles, but may also be installed at various locations on the vehicle and trailer using any number of commonly known securing means such as screws, clamps, brackets, nuts and bolts, adhesives, and other snap together, friction fit connectors which are able to support and hold the guide and target for directing coupling engagement.

Referring to FIG. 4, target 16 is shown constructed and arranged to include a plurality of telescoping segments that allow the target to be moved between various lengths so that target zone 30 can be manipulated to be positioned vertically above the trailer hitch to cooperate with the guide for directing coupling engagement. The telescoping segments provide adaptability in adjusting the target to work with a variety of trailers and different mounting positions. The target includes a lower segment, designated generally as 56, includes a first leg portion 58 integrating target offsetting member 38, which slidably engages a second leg portion 60 in a telescoping arrangement. The target includes a middle segment, designated generally as 62, includes a first leg portion 64 slidably engaging a second leg portion 66 in a telescoping arrangement. The target includes an upper segment, designated generally as 68, includes a first leg portion 70 slidably engaging a second leg portion 72 in a telescoping arrangement. Lower segment 56, middle segment 62, and upper segment 68 are pivotally interconnected so that target 16 can be manipulated to adjust the position of the target both vertically and horizontally to position target zone 30 over trailer hitch, and even offset the target as describe in detail above.

Target 16 further includes a crossbar 74 carried at one end of upper segment 68 that extends perpendicular to upper segment 68 for carrying the posts 28a and 28b. The posts extend perpendicular to the crossbar in a laterally spaced arrangement on the crossbar to provide target zone 30 for receiving guide 10. Preferably, crossbar 74 is swivel connected to upper segment 68 so that once aligned vertically over trailer hitch 20 as described above, crossbar 74 can be rotated to allow for directing coupling engagement at an angle. Pivot members 76a and 76b, in the form of universal joints, are provided for interconnecting posts 28a and 28b with crossbar 74, respectively. The pivot members are biased to maintain the posts in a vertical parallel arrangement, while allowing the posts to bend if struck by the guide during the process of coupling engagement. The pivot members are biased using springs 78a and 78b having a first end affixed to crossbar 74 and a second end affixed to posts 28a and 28b, respectively. Other means commonly known to a person skilled in the art can also be used to maintain the posts in parallel arrangement to crossbar 74, while allowing the posts to bend if struck by the guide. For example, pivot members 76a and 76b may also comprise a flexible rubber leg segment 102 of the type shown in FIG. 8a, or a flexible spring leg segment 104 of the type shown in FIG. 8b.

Additionally, in the preferred embodiment, target lighting members 80a and 80b are carried by posts 28a and 28b for lighting the posts to increase visibility in low light conditions to assist the driver in directing the guide between the posts and into target zone 30. Further, posts 28a and 28b can be made from semi-opaque plastic to allow for target lighting members 80a and 80b to cause the entire post to light up. As well, guide 10 may also be constructed to include a guide lighting member 106, best shown in FIG. 9, preferably carried by sensor bar 33, for lighting the guide to increase visibility in low light conditions to assist the driver in directing the guide between the posts and into target zone 30. Preferably, sensor bar 33 is made from semi-opaque plastic to allow for guide lighting member 106 to cause the entire sensor bar to light up.

Referring to FIGS. 3 and 4, posts 28a and 28b are capable of telescoping between a retracted position as illustrated in FIG. 4, and an extended position as illustrated in FIG. 3 so that the posts can be positioned to be viewed by the driver.

Referring to FIG. 5, guide 10 is shown constructed and arranged to included a plurality of telescoping segments that allow the guide to be moved between various lengths so that guide 10 can be manipulated to be positioned vertically above the towing vehicle hitch to cooperate with target 16 for directing coupling engagement. The telescoping segments provide adaptability in adjusting the guide to work with a variety of towing vehicles and different mounting positions. The guide includes a lower segment, designated generally as 82, includes a first leg portion 84 integrating guide offsetting member 36, which slidably engages a second leg portion 86 in a telescoping arrangement. The guide includes a middle segment, designated generally as 88, includes a first leg portion 90 slidably engaging a second leg portion 92 in a telescoping arrangement. The guide includes an upper segment, designated generally as 94 includes a first leg portion 96 slidably engaging a second leg portion 98 in a telescoping arrangement. Sensor bar 33 is pivotally interconnected to upper segment 94. Lower segment 82, middle segment 88, and upper segment 94 are pivotally interconnected so that guide 10 can be manipulated to adjust the position of the guide both vertically and horizontally to position the guide to cooperate with target zone 30 and align vertically over towing vehicle hitch 14, and even offset the guide as describe in detail above.

Preferably, a level indicator 100 is carried by the guide and the target for horizontal alignment of the guide and the target to facilitate accurate coupling engagement between the towing vehicle hitch and the trailer hitch.

Figure 8A:
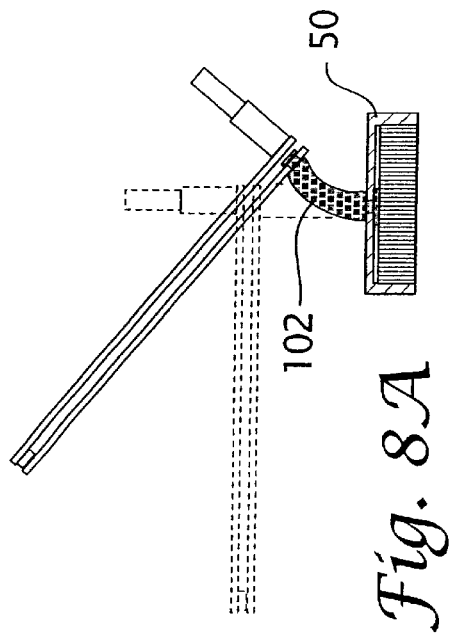
FIGS. 8a and 8b show a side view of a flexible member for interconnecting the guide with an attachment member according to the invention; and, FIG. 9 shows and alternative embodiment of said guide according to the invention.
Figure 8B:
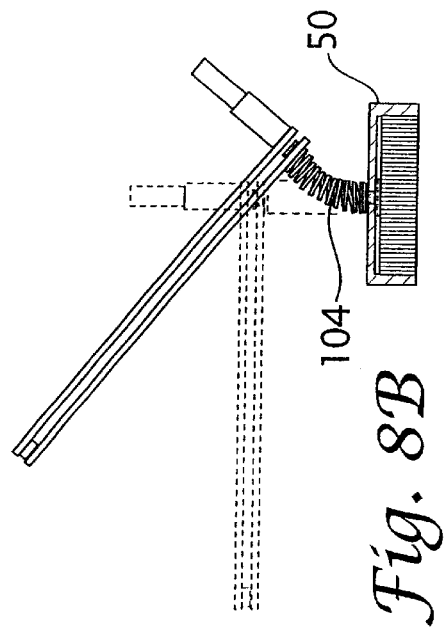

Referring to FIGS. 8a and 8b, a flexible base member, in the form of a rubber leg segment 102, or a spring leg segment 104, is adapted for carrying guide 10 and target 16 on attachment member 50. The flexible base member allows the target or guide to bend at its base if accidentally struck during coupling engagement to prevent damage.

Figure 9:
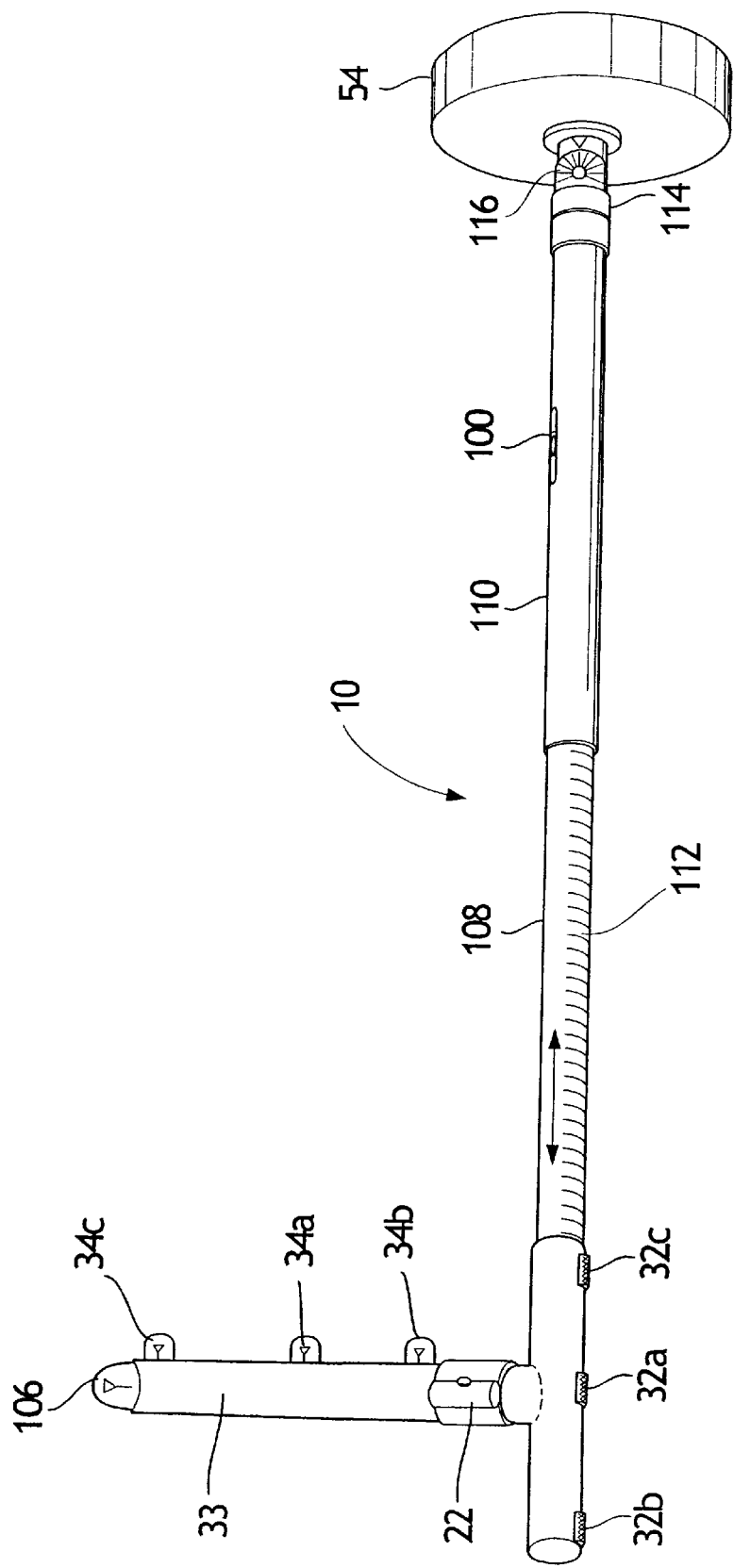

Referring to FIG. 9, an alternative embodiment of the guide is provided in which sensor bar 33 is vertically oriented with indicators 34a–c being carried on the sensor bar in a vertically spaced arrangement facing the driver. This can provide improved reference to the driver for aligning the guide and target, as well as better visibility of the multiple indicator lights. Sensors 32a–c must remain in horizontal arrangement for detecting when the guide is entering and exiting the target zone. Accordingly, in the embodiment of FIG. 9, the sensors are positioned below sensor bar 33 and horizontally spaced on first arm 108 so that sensor 32a is still vertically aligned with guide positioning member 22 for the reasons set forth above. As shown in FIG. 9, the alternative embodiment of the guide includes first arm 108 placed in telescoping arrangement with a second arm 110. The first arm including a series of length reference markings 112 to indicate the distance first arm 108 is moved in relation to second arm 110 so that the guide can repeatedly be extended an exact distance from the towing vehicle to align the guide over the towing vehicle hitch. Additionally, second arm 110 includes a hinge 114 interconnecting the second arm to a guide attachment member for mounting the guide to the towing vehicle. The hinge including a series of angle reference markings 116 indicating the angle at which the hinge is positioning the guide in relation to the guide attachment member. The hinge allows the guide to be carried horizontally while the guide attachment member 54 may be mounted to the towing vehicle at an angle.

In order to supply power to the guide and target, a battery pack my be incorporated. Alternatively, any number of commonly known wiring means may be used to connect the guide to the vehicles power supply or the target to the trailer power supply. In a further advantageous embodiment, a power monitoring light is included in the target and the guide for indicating a sufficient power supply to operate the target and guide.

While a preferred embodiment of the invention has been described using specific terms, such description is for illustrative purposes only, and it is to be understood that changes and variations may be made without departing from the spirit or scope of the following claims.

What is claimed is:

1. A trailer hitch alignment apparatus for assisting a driver in directing coupling engagement between a towing vehicle hitch and a trailer hitch, said apparatus comprising:
   a guide carried by the towing vehicle representing the position of said towing vehicle hitch for being visible to the driver;
   a target carried by the trailer representing the position of said trailer hitch for being visible to the driver;
   said target having a pair of laterally spaced posts defining a target zone for receiving said guide to align said towing vehicle hitch with said trailer hitch for coupling engagement;
   at least one sensor mounted on said guide for passing between said laterally spaced posts when said guide is received by said target zone; said sensor detecting the presence of at least one of said laterally spaced posts as said guide and said sensor are directed into said target zone for sensing the relative position of said guide to said at least one post; and
   an indicator operatively associated with said sensor for indicating to the driver when said guide is within said target zone to alert the driver of alignment between said towing vehicle hitch and said trailer hitch for coupling engagement.

2. The apparatus of claim 1 including a guide positioning member operatively associate with said guide for vertically aligning said guide over said towing vehicle hitch.

3. The apparatus of claim 1 wherein said guide includes a guide offsetting member for laterally offsetting said guide; said guide offsetting member having an aligned position wherein said guide is positioned vertically above said towing vehicle hitch, and an offset position wherein said guide is shifted laterally from said aligned position.

4. The apparatus of claim 3 wherein said target includes a target offsetting member for laterally offsetting said target; said target offsetting member having a first position wherein said target is positioned vertically above said trailer hitch, and a second position wherein said target is shifted laterally from said first position a distance equal to the lateral shift of said guide in said offset position so that said target cooperates with said guide in said offset position to provide an offset visual representation to the driver as to the position of said towing vehicle hitch and said trailer hitch for directing coupling engagement.

5. The apparatus of claim 1 wherein said guide includes a first sensor for determining when said guide is entering said target zone, a second sensor for determining when said guide is aligned within said target zone for coupling engagement, and a third sensor for determining when said guide has passed through said target zone.

6. The apparatus of claim 5 wherein said guide including a first indicator operatively associated with said first sensor for signaling the driver when said guide is entering said target zone, a second indicator operatively associated with said second sensor for signaling the driver when said guide is aligned for coupling engagement, and a third indicator operatively associated with said third sensor for signaling the driver when said guide has passed through said target zone.

7. The apparatus of claim 1 including a guide attachment member carried by said guide for mounting said guide to said towing vehicle.

8. The apparatus of claim 7 including a flexible base member included in said guide interconnecting said guide with said guide attachment member so that said guide can bend if accidentally contacting said target during coupling engagement.

9. The apparatus of claim 1 including a target attachment member carried by said target for mounting said target to the trailer.

10. The apparatus of claim 9 including a flexible base member included in said target interconnecting said target with said target attachment member so that said target can bend if accidentally contacting said guide during coupling engagement.

11. The apparatus of claim 1 including a level indicator carried by said guide and said target for horizontal alignment of said guide and said target to facilitate accurate coupling engagement between said towing vehicle hitch and said trailer hitch.

12. The apparatus of claim 1 including at least one target lighting member carried by said target for lighting said posts defining said target zone to increase visibility in low light conditions to assist the driver in directing the guide into said target zone.

13. The apparatus of claim 1 including at least one guide lighting member carried by said guide for lighting said guide to increase visibility in low light conditions to assist the driver in directing the guide into said target zone.

14. The apparatus of claim 1 including a pivot member carrying said posts on said target; said pivot member being biased to maintain said posts in vertical parallel arrangement while allowing said posts to bend if struck by said guide during coupling engagement.

15. The apparatus of claim 1 wherein said guide is constructed and arranged to telescope between various lengths so that said guide can be manipulated to be positioned vertically above said towing vehicle hitch.

16. The apparatus of claim 1 wherein said guide includes a first arm placed in telescoping arrangement with a second arm; and said first arm including a series of length reference markings to indicate the distance said first arm is moved in relation to said second arm so that the guide can repeatedly be extended an exact distance from said towing vehicle to align said guide over said towing vehicle hitch.

17. The apparatus of claim 16 wherein said second arm includes a hinge interconnecting said second arm to a guide attachment member for mounting said guide to said towing vehicle; said hinge including a series of angle reference markings indicating the angle at which said hinge is positioning said guide in relation to said guide attachment member.

18. The apparatus of claim 1 wherein said target is constructed and arranged to telescope between various lengths so that said target zone can be manipulated to be positioned vertically above said trailer hitch to cooperate with said guide for directing coupling engagement.

19. A trailer hitch alignment apparatus providing a visual aid to a driver to assist in directing coupling engagement between a towing vehicle hitch and a trailer hitch, said apparatus comprising:

a guide adjustably carried by the towing vehicle;

a target adjustably carried by the trailer for cooperating with said guide to represent alignment between said towing vehicle hitch and said trailer hitch for directing coupling engagement;

said target having a pair of laterally spaced posts defining a target zone for receiving said guide;

at least one sensor carried by said guide at a location on said guide for passing between said laterally spaced posts during alignment; said sensor determining when said guide is entering said target zone, when said guide is aligned within said target zone for proper coupling engagement between the towing vehicle hitch and the trailer hitch, and when said guide has passed outside said target zone; and, an indicator operatively associated with said sensor for indicating to the driver when said guide is in alignment with said target;

whereby a visual aid is provided by which the driver can align the towing vehicle hitch with the trailer hitch for coupling engagement.

20. The apparatus of claim 19 including a guide positioning member operatively associated with said guide for emitting a light beam between said guide and said towing vehicle hitch by which the guide can be vertically aligned above said towing vehicle hitch.

21. The apparatus of claim 19 including a target positioning member operatively associated with said target for emitting a light beam between said target and said trailer hitch by which the target can be vertically aligned above said trailer hitch for directing coupling engagement.

22. A trailer hitch alignment apparatus providing a visual aid to a driver to assist in directing coupling engagement between a towing vehicle hitch and a trailer hitch, said apparatus comprising:

a guide carried by the towing vehicle having a guide offsetting member;

said guide offsetting member having an aligned position wherein said guide is positioned vertically above said towing vehicle hitch, and an offset position wherein said guide is shifted laterally from said aligned position for moving the guide to a location viewable by the driver;

a target carried by the trailer having a target offsetting member;

said target offsetting member having a first position wherein said target is positioned vertically above said trailer hitch, and a second position wherein said target is shifted laterally from said first position a distance equal to the lateral shift of said guide in said offset position for cooperating with said guide to direct coupling engagement;

whereby said target cooperates with said guide in said offset position to provide an offset visual representation to the driver as to the position of said towing vehicle hitch and said trailer hitch for directing the driver to align said towing vehicle hitch and trailer hitch for coupling engagement.

23. The apparatus of claim 22 including a guide positioning member operatively associate with said guide for vertically aligning said guide over said towing vehicle hitch.

24. The apparatus of claim 22 wherein said target includes a pair of laterally spaced posts defining a target zone for receiving said guide to align said towing vehicle hitch with said trailer hitch for coupling engagement.

25. The apparatus of claim 24 including a sensor carried by said guide for determining whether said guide is within said target zone.

26. The apparatus of claim 25 including an indicator operatively associated with said sensor for indicating to the driver when said guide is within said target zone to alert the driver of alignment between said towing vehicle hitch and said trailer hitch for coupling engagement.

* * * * *